(12) United States Patent
Leshem

(10) Patent No.: US 7,609,789 B2
(45) Date of Patent: Oct. 27, 2009

(54) PHASE NOISE COMPENSATION FOR MIMO WLAN SYSTEMS

(75) Inventor: Amir Leshem, Shoham (IL)

(73) Assignee: MetaLink, Ltd., Yakum (IL)

( * ) Notice: Subject to any disclaimer, the term of this patent is extended or adjusted under 35 U.S.C. 154(b) by 629 days.

(21) Appl. No.: 11/132,717

(22) Filed: May 19, 2005

(65) Prior Publication Data

US 2006/0262868 A1 Nov. 23, 2006

(51) Int. Cl.
 H04K 1/10 (2006.01)
(52) U.S. Cl. .................. 375/346; 375/260; 455/296; 455/63.1
(58) Field of Classification Search .......... 375/260, 375/326, 346; 370/208, 203, 210; 455/278.1, 455/222, 296, 63.1
See application file for complete search history.

(56) References Cited

U.S. PATENT DOCUMENTS

| | | | | |
|---|---|---|---|---|
| 7,039,004 | B2 * | 5/2006 | Sun et al. .................. | 370/208 |
| 7,058,147 | B2 * | 6/2006 | Erving et al. .............. | 375/348 |
| 7,130,355 | B1 * | 10/2006 | Al-Dhahir et al. .......... | 375/267 |
| 7,190,734 | B2 * | 3/2007 | Giannakis et al. .......... | 375/267 |
| 7,277,503 | B2 * | 10/2007 | Huang et al. ............... | 375/327 |
| 2002/0191535 | A1 * | 12/2002 | Sugiyama et al. .......... | 370/208 |
| 2004/0171366 | A1 * | 9/2004 | Bar-Ness et al. .......... | 455/278.1 |
| 2005/0078599 | A1 * | 4/2005 | Zhidkov et al. ............ | 370/210 |
| 2005/0123073 | A1 * | 6/2005 | Ginesi et al. ............... | 375/326 |
| 2005/0152314 | A1 * | 7/2005 | Sun et al. .................. | 370/334 |
| 2006/0251198 | A1 * | 11/2006 | Ma et al. ................... | 375/350 |

OTHER PUBLICATIONS

Anastasios Stamoulis, Suhas N.Diggavi, Naofal Al-Dhahir, "Intercarrier Interference in MIMO OFDM", IEEE Transactions on Signal Processing, vol. 50, No. 10, Oct. 2002.*
Songping Wu, Yeheskel Bar-Ness "Computationally Efficient Phase Noise Cancellation Technique in OFDM Systems with Phase Noise", Center for Communications and Signal Processing Research New Jersey Institute of Technology,ISSSTA2004, Sydney, Australia, Aug. 30-Sep. 2, 2004, IEEE.*
Jie Zhu, Wookwon Lee "Carrier Frequency Offset Estimation for OFDM Systems with Null Subcarriers", University of Arkansas, 2004 IEEE.*
Guanghui Liu and Weile Zhu, "Compensation of Phase Noise in OFDM Systems Using an ICI Reduction Scheme", Dec. 2004.*
Zhang Jianhua, Hermann Rohling and Zhang Ping, "Analysis of ICI Cancellation Scheme in OFDM Systems With Phase Noise", Jun. 2004.*

* cited by examiner

*Primary Examiner*—Shuwang Liu
*Assistant Examiner*—Aristocratis Fotakis
(74) *Attorney, Agent, or Firm*—Martin Fleit; Paul D. Bianco; Fleit Gibbons Gutman Bongini & Bianco PL

(57) ABSTRACT

The present invention provides a method for reducing phase noise in OFDM systems by analyzing a time-dependent representation of the phase noise that changes in real time according to received data. The analysis of real time signals is based on processing statistical properties of phase noise and received data. The statistical properties of phase noise are represented by a covariance matrix $R_{\psi\psi}$. The basis of the multiplicative phase noise decomposition which represents the varying in time phase noise component, is selected from the eigenvectors of $R_{\psi\psi}$. The present invention suggests replacing the fixed representation of the phase noise as suggested by prior art with a system and time-dependent representation that changes in real time according to received data.

The method according to the present invention is implemented within An OFDM transceiver.

1 Claim, 19 Drawing Sheets

Phase noise compensation unit 105

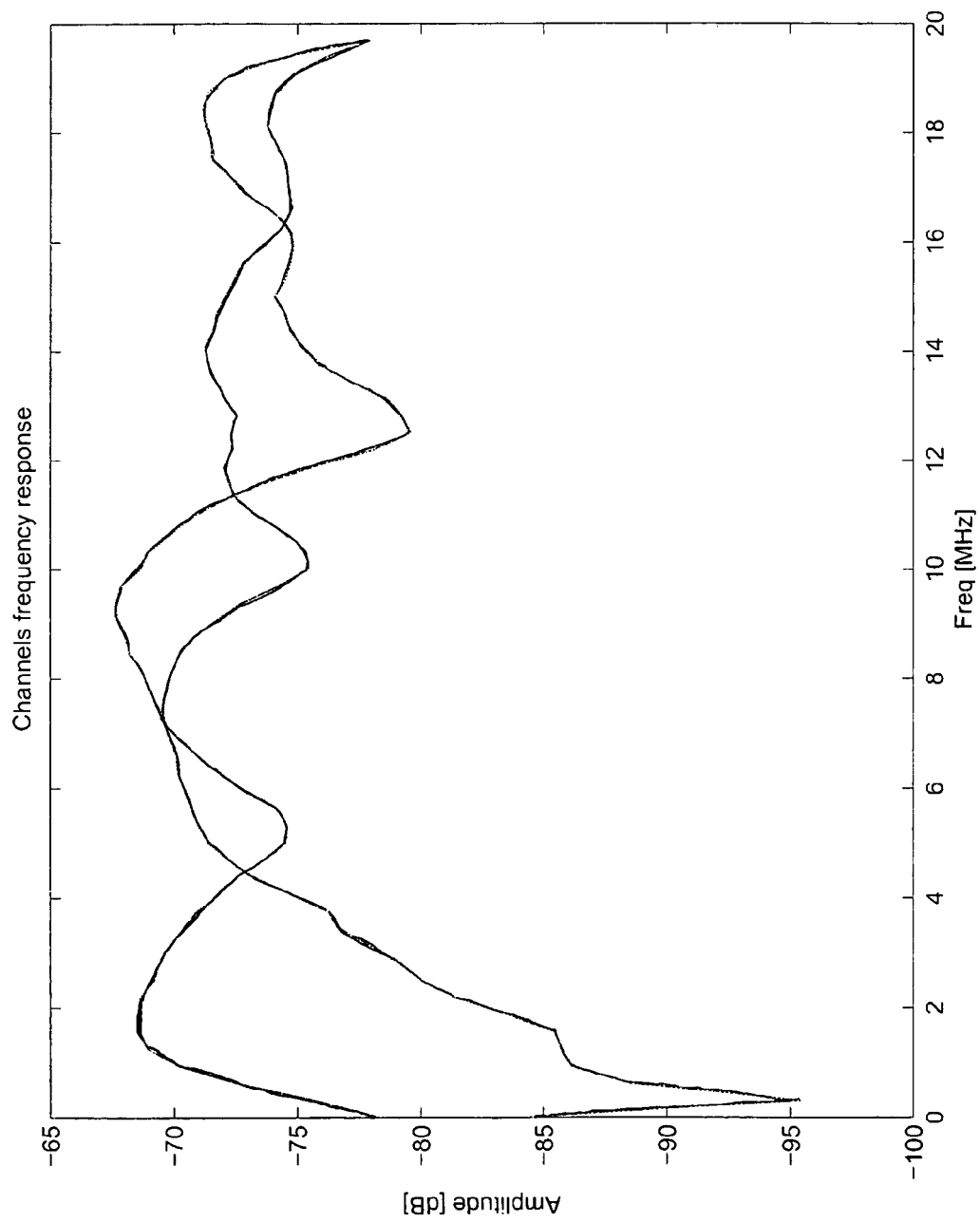
Figure 7: Two 20 MHz receive channels.

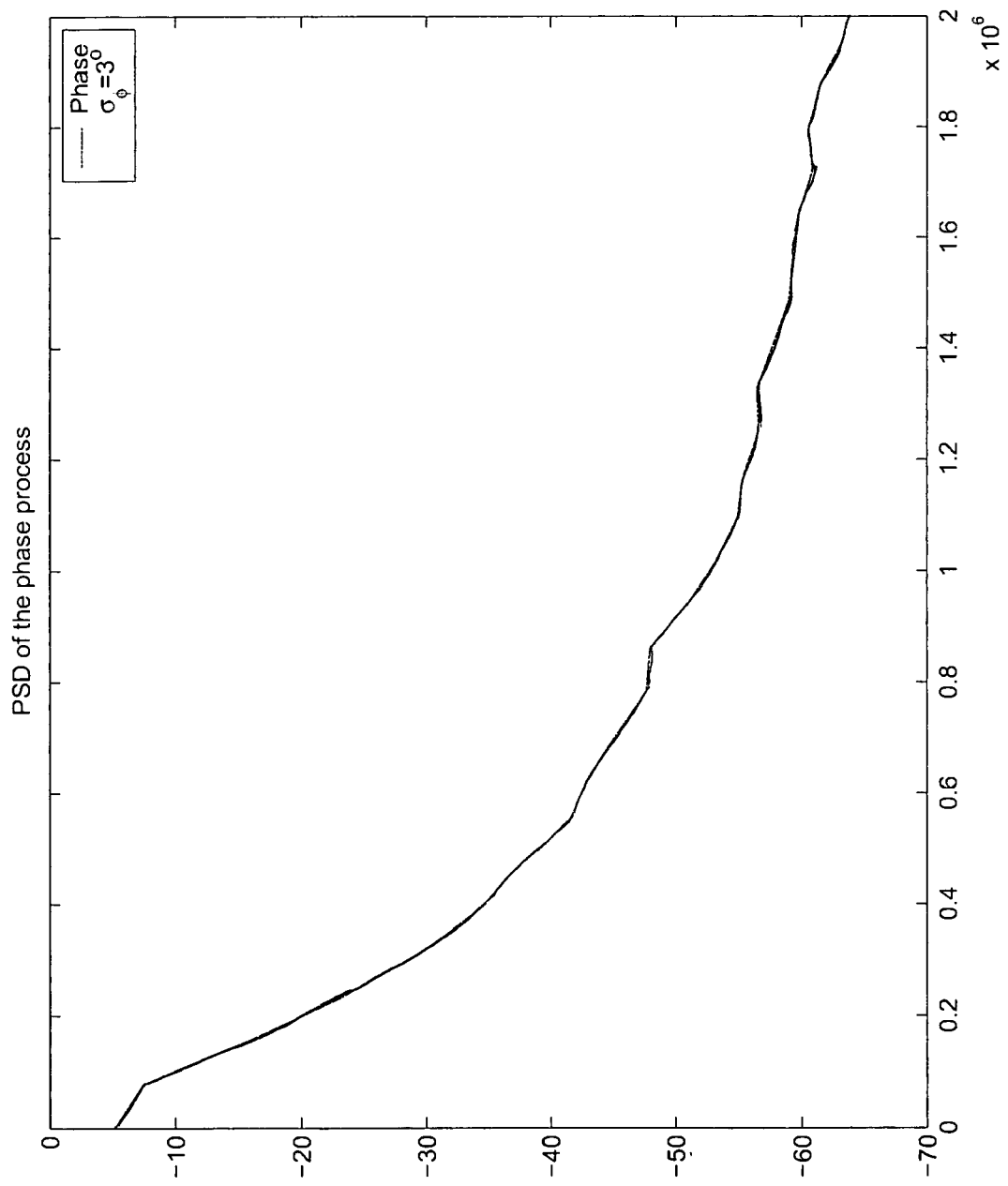
Figure 8: Phase noise process PSD.

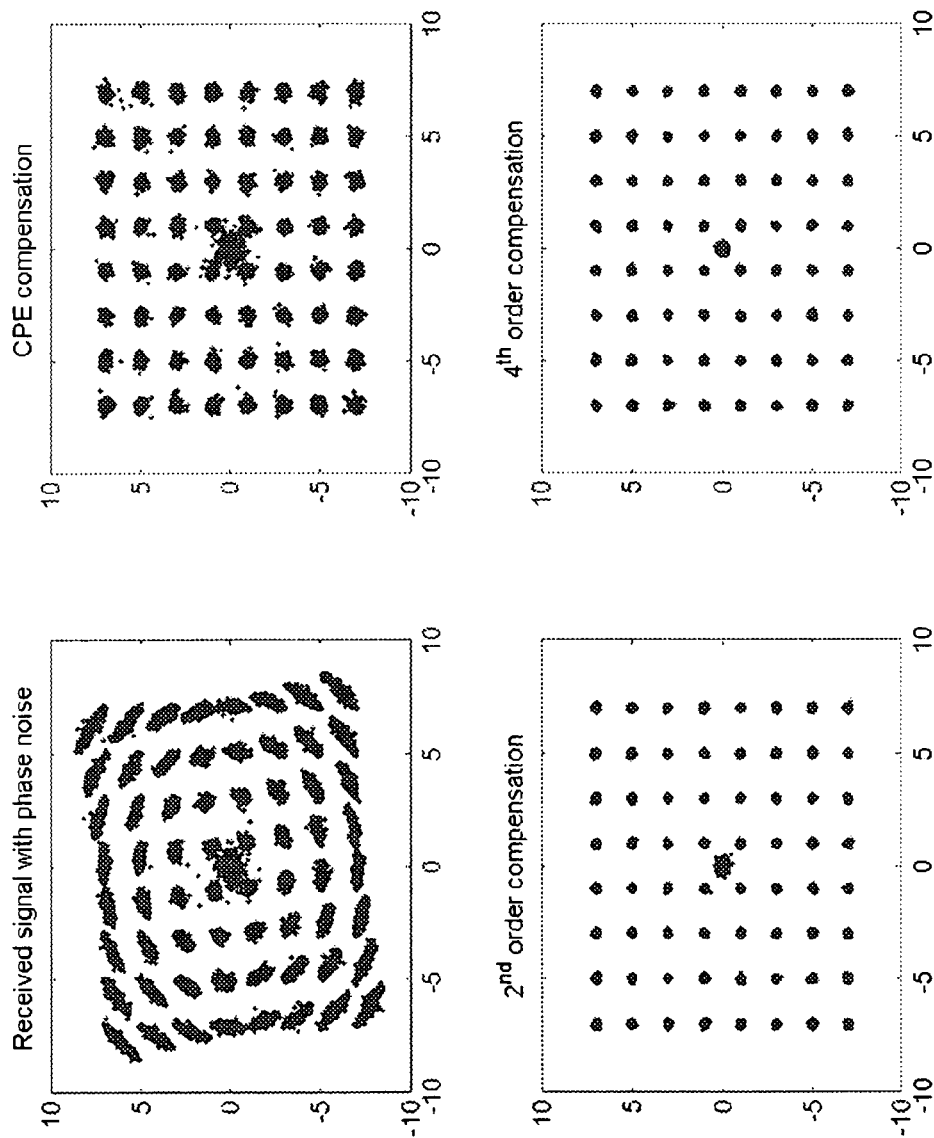
Figure 9: Phase noise compensation using KL basis vectors. Constellation diagram. Original phase noise . (a) with phase noise. (b) CPE compensation. (c) second order compensation. (d) fourth order compensation.

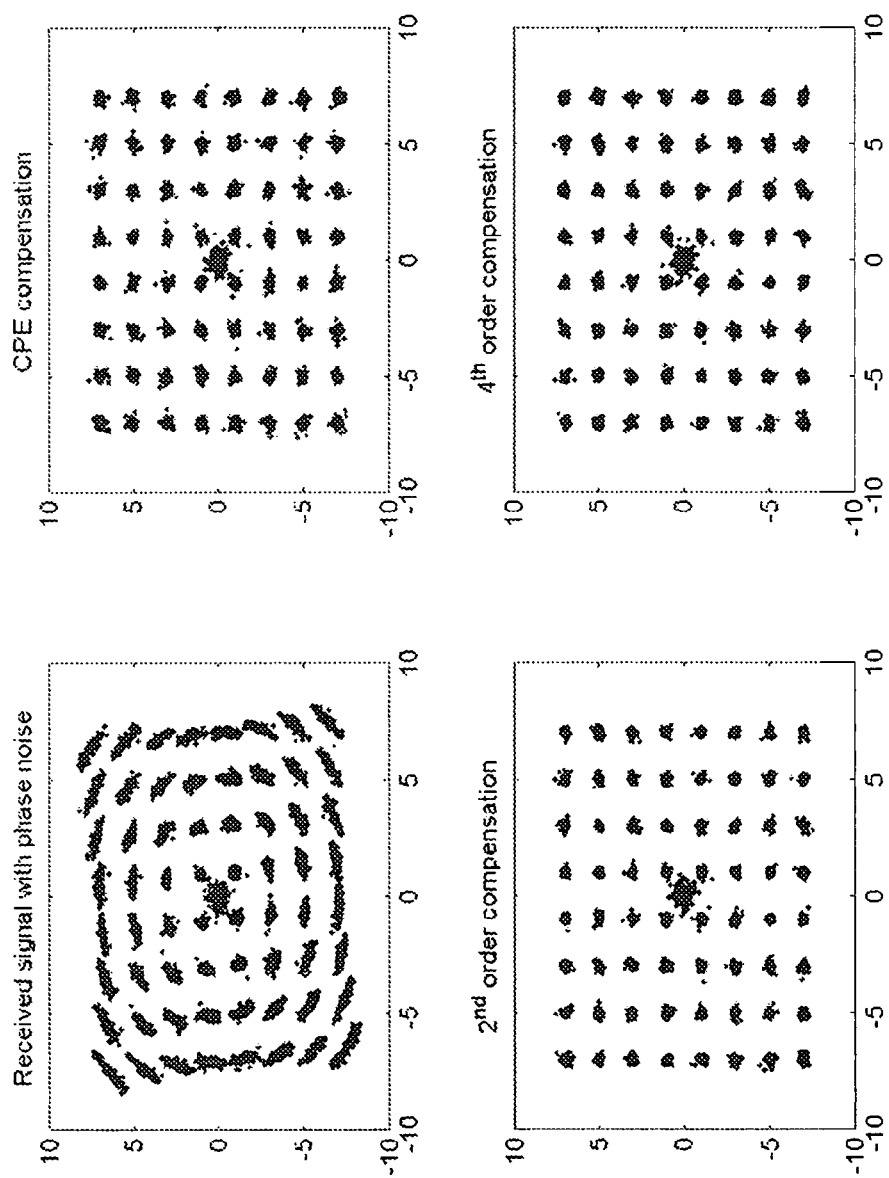
Figure 10: Phase noise compensation using DFT basis vectors. Constellation diagram. Original phase noise. (a) with phase noise. (b) CPE compensation. (c) second order compensation. (d) fourth order compensation.

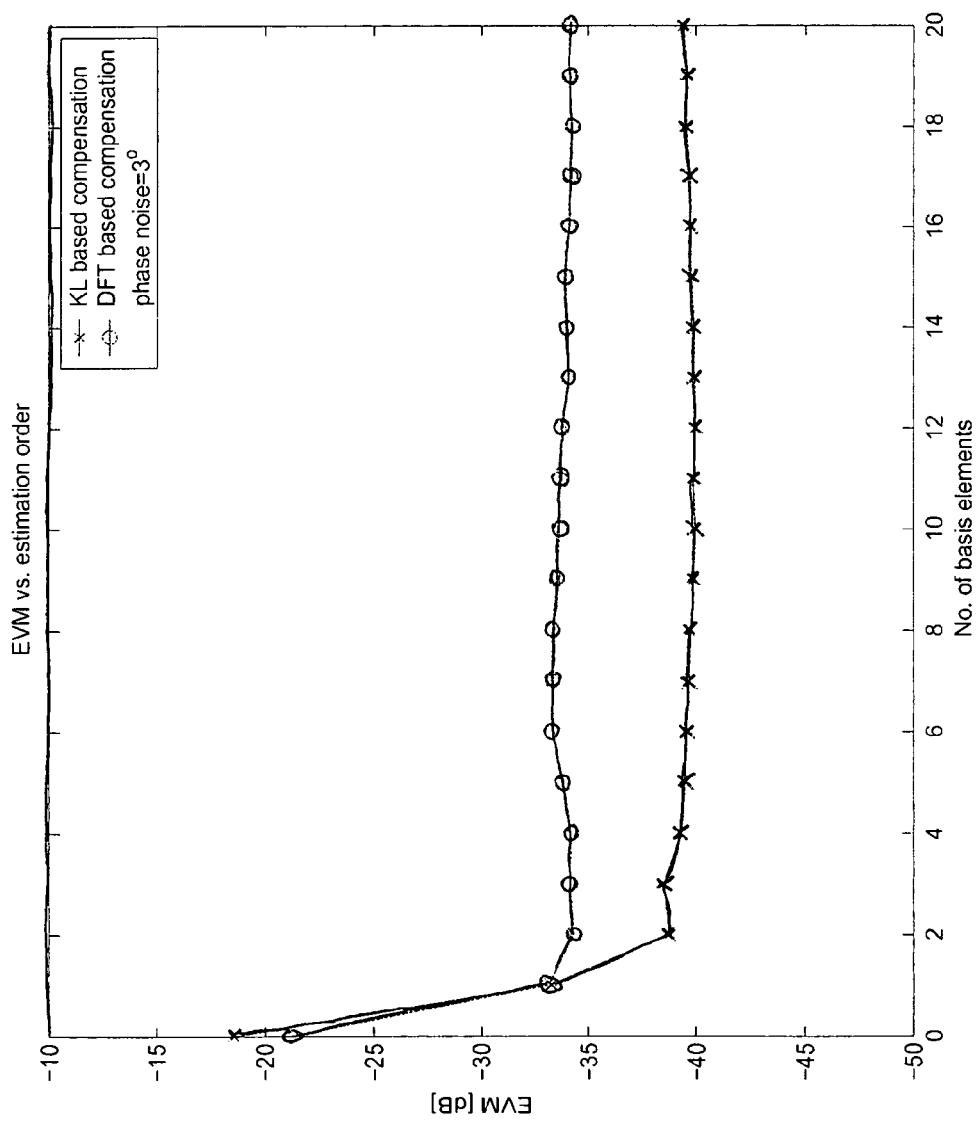
Figure 11: EVM vs. number of basis elements for DFT and KL based methods. Phase noise.
0- No compensation. 1- CPE compensation.

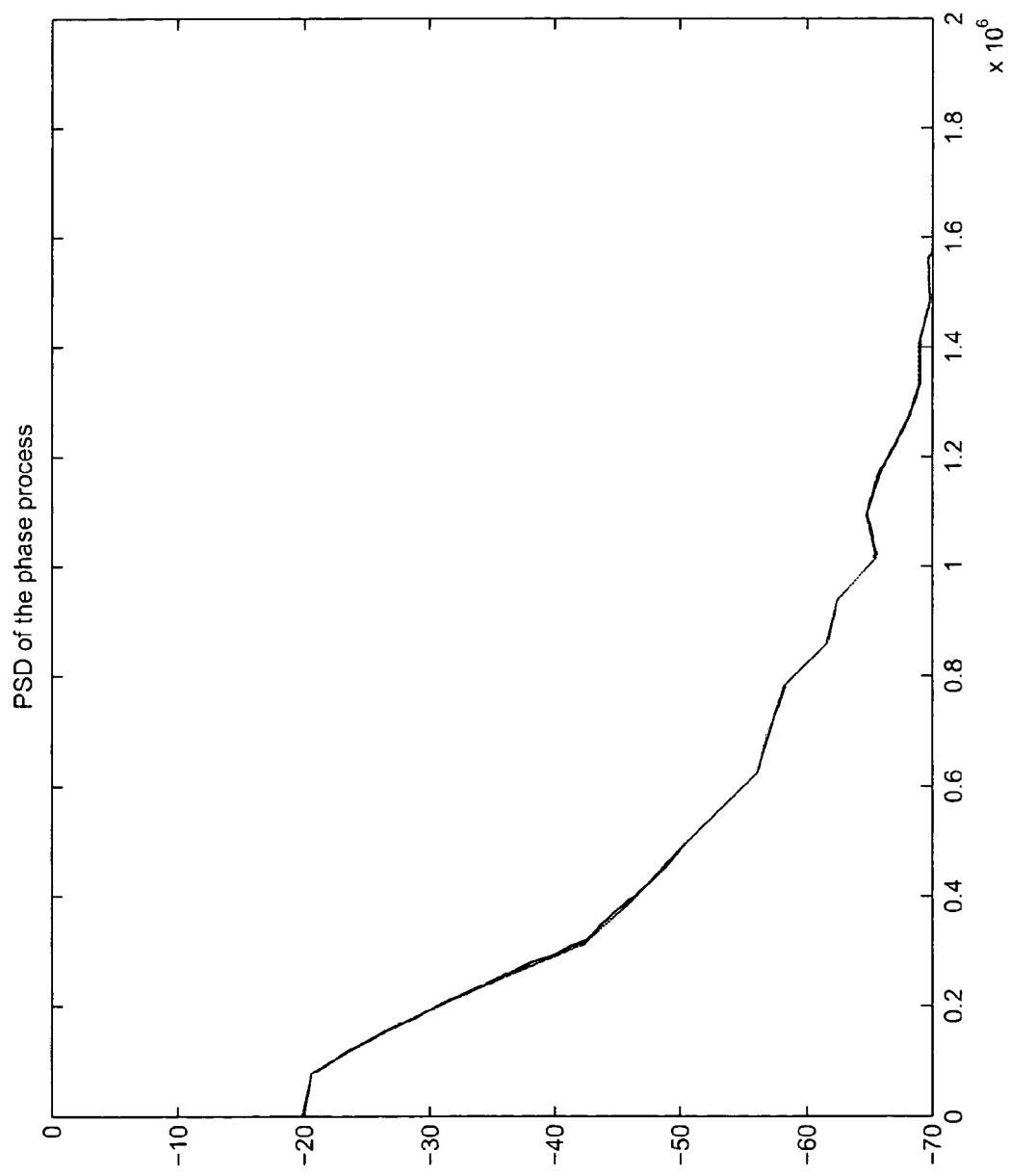
Figure 12: Phase noise PSD with

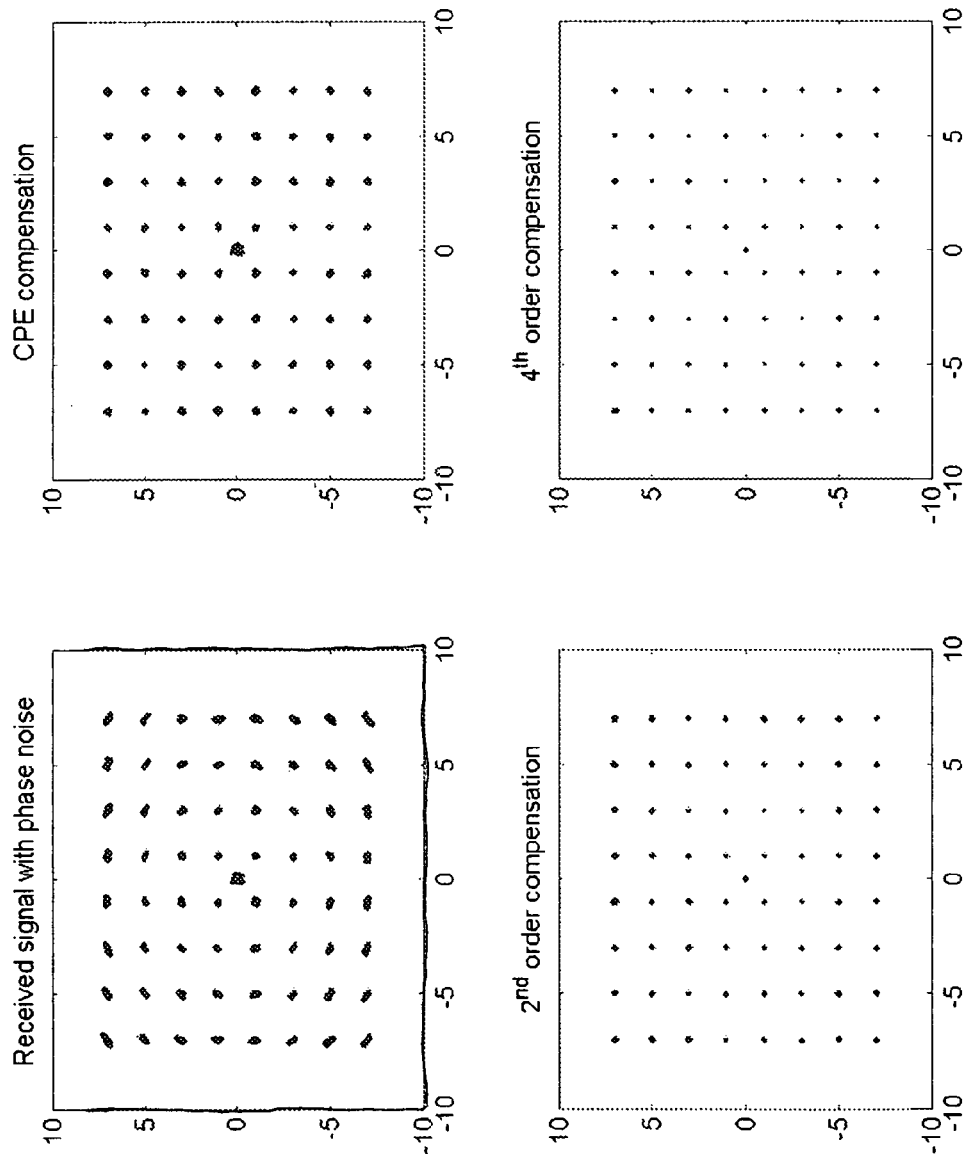
Figure 13: Constellation diagram for KL based compensation. Original phase noise. (a) with phase noise. (b) CPE compensation. (c) second order compensation. (d) fourth order compensation

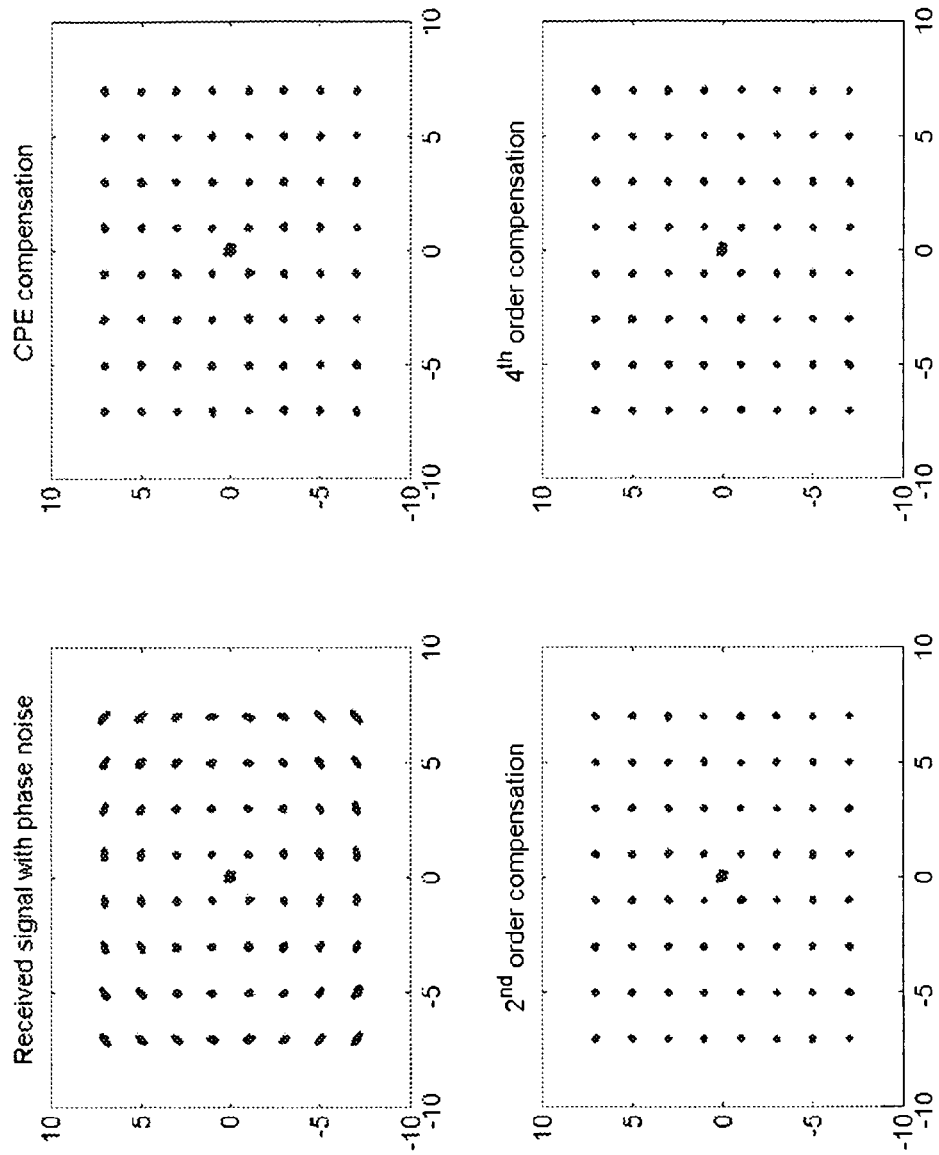
Figure 14: Constellation diagram for DFT based compensation. Original phase noise. (a) with phase noise. (b) CPE compensation. (c) second order compensation. (d) fourth order compensation

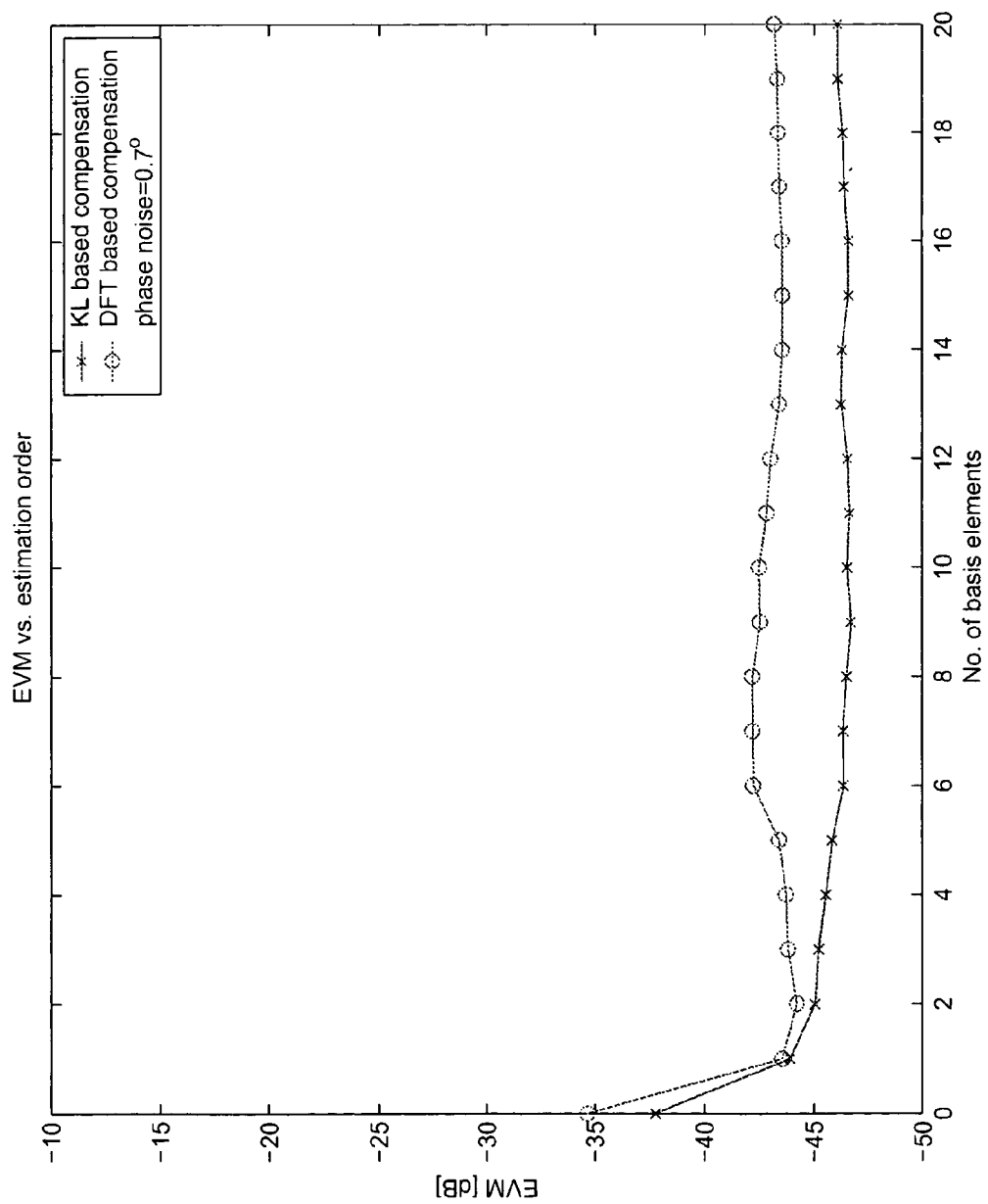
Figure 15: EVM vs. number of basis elements for DFT and KL based methods. 0- No compensation. 1- CPE compensation.

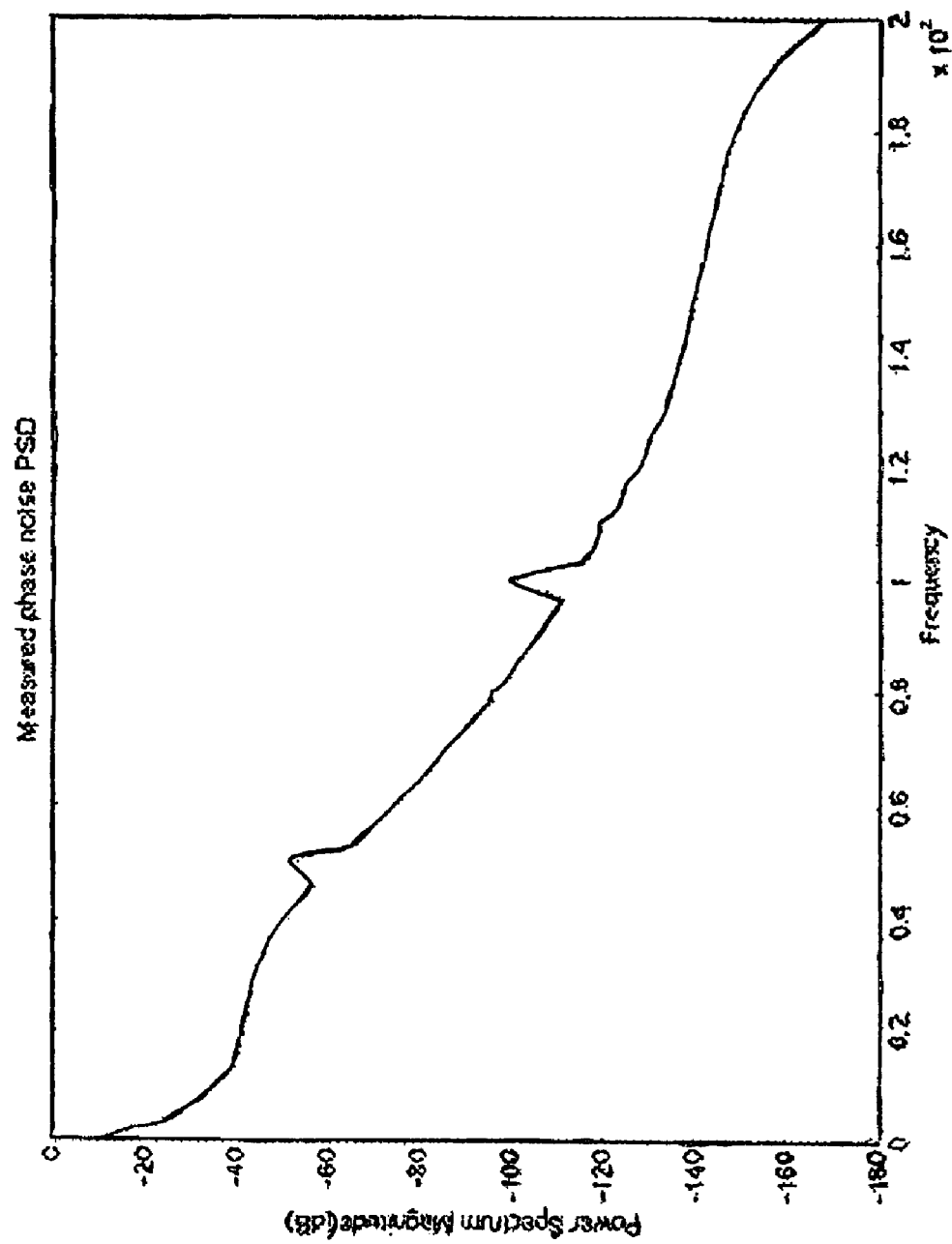
Figure 16: PSD of measured phase noise.

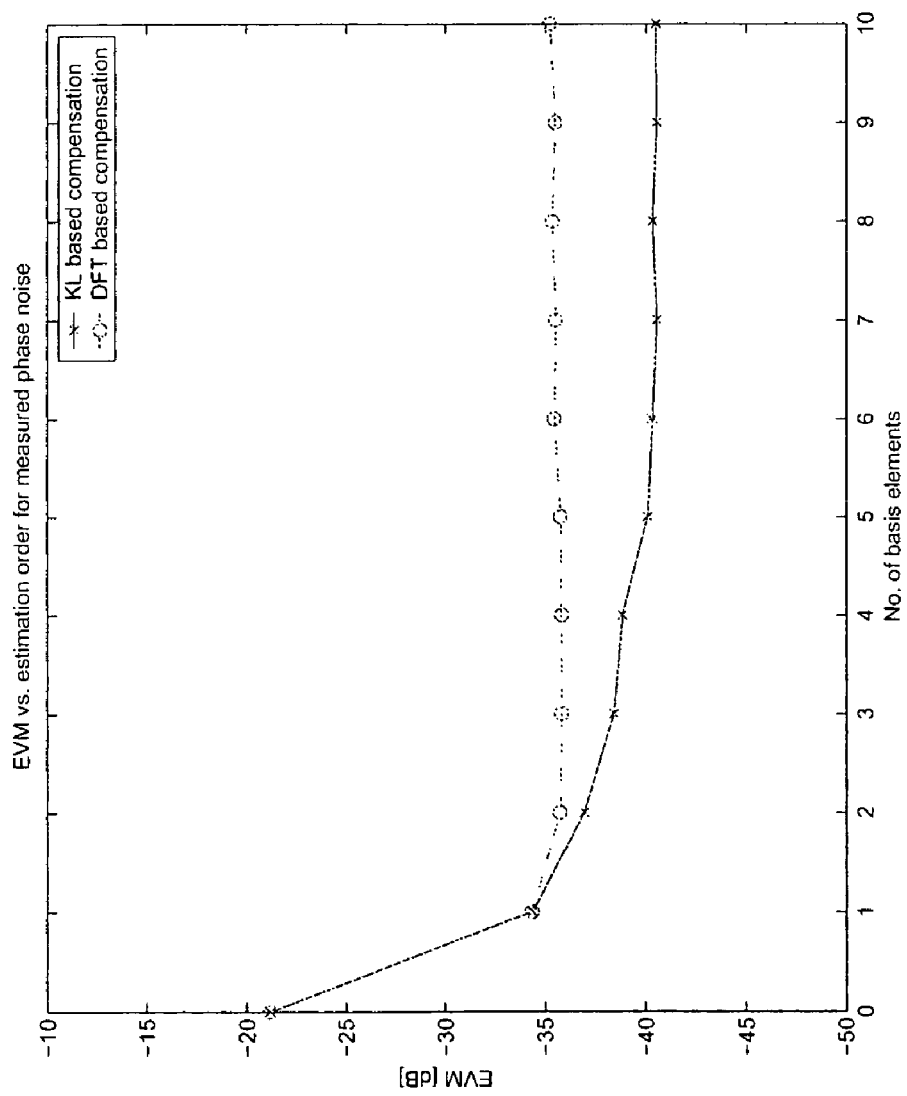
Figure 17: EVM vs. number of basis elements for DFT and KL based methods. 0- No compensation. 1- CPE compensation.

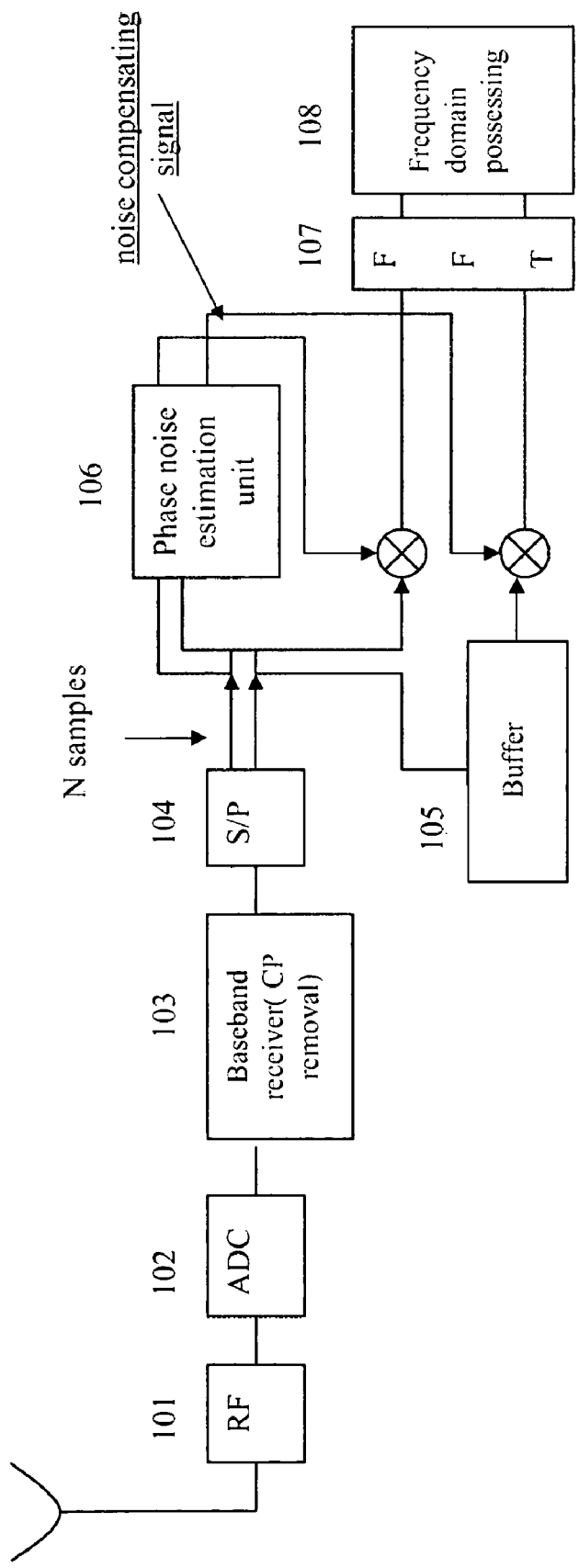
Figure 18: Receiver structure for SISO

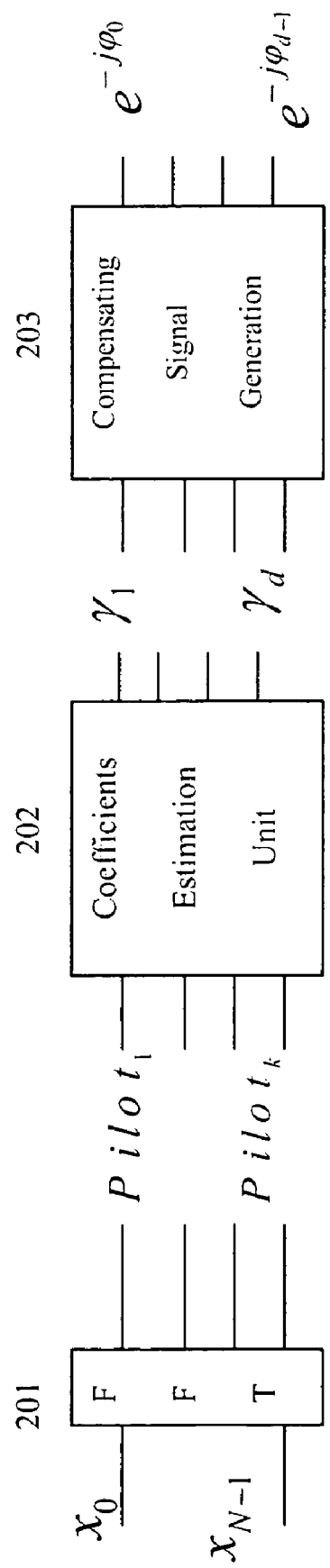
Figure 19: Phase noise compensation unit 105

PHASE NOISE COMPENSATION FOR MIMO WLAN SYSTEMS

FIELD OF THE INVENTION

The present invention relates to wireless communications. More particularly it relates to a method of compensating for carrier phase noise in OFDM communication systems.

BACKGROUND OF THE INVENTION

Frequency division multiplexing (FDM) is a technology for transmitting multiple signals simultaneously over a single transmission path, such as a cable or wireless system. Each signal is transmitted within its own unique frequency range on a carrier wave that is modulated by data (text, voice, video, etc.).

The orthogonal FDM (OFDM) modulation technique distributes the data over a large number of carriers that are spaced apart at precise frequencies. This spacing provides "orthogonality", which prevents the demodulators from detecting frequencies other than their own.

Orthogonal frequency division multiplexing (OFDM) has been implemented in the wireless local-area-network (WLAN) IEEE 802.11 as well as digital audio broadcasting (DAB) and asymmetric digital subscriber line (ADSL) standards.

The main advantages of OFDM are its high spectral efficiency and its ability to deal with frequency-selective fading and narrowband interference. The spectral efficiency of OFDM systems can be further increased by adding multiple antenna techniques, also known as multiple-input multiple-output (MIMO) techniques. The indoor deployment of WLANs makes MIMO OFDM a strong candidate for high throughput extensions of current WLAN standards because the throughput enhancement of MIMO is especially high in richly-scattered scenarios, of which indoor environments are typical examples.

The performance of OFDM systems is seriously affected by phase noise. Phase noise occurs due to the instability of the system local oscillator. This instability spreads the power spectral density (PSD) of the local oscillator across adjacent frequencies, rather than remaining concentrated at a particular frequency. This type of phase noise is common in conventional oscillators. Consequently, carriers generated by these oscillators are not strictly "orthogonal", and therefore inter-carrier interference (ICI) and inter-symbol interference (ISI) occurs in the received signal.

Such phase noise resulting from a difference between the carrier frequency and the local oscillator is a limiting factor for OFDM system performance, particularly for high data rates. Phase noise can be seen as consisting of two components: a common phase error (CPE) component that is common to all carriers and a time varying component that is frequency dependent. The time varying component, which is typically weaker than the CPE component, generates ICI. CPE can be removed by averaging over all carriers. Methods for eliminating CPE are known to those skilled in the art, e.g., a technique proposed by Schenk et al. Further improvements in phase noise suppression are disclosed in U.S. patent application no. 2004/0190637 by Maltsev, et al. They combine pilot subcarriers of data symbols to generate an observation vector. After that, recursive filtering of the observation vectors is performed to generate the phase compensation estimate. Although the generation of observation vectors is based on received data, the found vector is constant during symbol time and therefore accounts only for common phase noise. Furthermore the compensation is done in the frequency domain and therefore cannot restore orthogonality when ICI is present.

There remains to be found a satisfactory method for suppressing ICI in OFDM systems. A common approach for ICI mitigation was presented by Wu and Bar-Ness. Another approach is time domain processing as described by Casas, et al. Casas proposes phase noise representation in a fixed basis independent of the system or specific external conditions. The dominant phase noise components are then estimated using least square (LS) fitting of several base vectors. When single base vector is used, the method reduces to that of Wu and Bar-Ness.

The method proposed by Casas is not an optimal solution because phase noise cannot be compactly represented in a fixed basis for all systems.

The present patent discloses a method where phase noise is represented in a system-dependent basis (derived from the received data or precalibrated) rather than in a fixed basis as in the prior art. This technique provides a significant reduction in phase noise and works well for strong phase noise. The system-dependent and time-dependent basis for phase noise representation that is proposed in the present patent is its primary innovation over previous methods. The present patent also discloses other possible enhancements of the technique for MIMO systems, such as online calibration and exploitation of null tones.

SUMMARY OF THE INVENTION

The present invention relates to a method of compensating for carrier phase noise in OFDM communication systems. Phase noise occurs due to the instability of the local system oscillator and causes inter-carrier interference (ICI) of adjacent tones. Phase noise can be seen as consisting of two components: a common phase error (CPE) component that is common to all carriers and a time varying component that is frequency dependent. CPE can be removed by averaging over all carriers. Methods for eliminating CPE are known to those skilled in the art. The present patent discloses a method for reducing the time varying component of phase noise. This method is an enhancement of the technique known in the prior art based on phase noise representation in a fixed basis independent of the system or specific external conditions [Casas et al.]. The method proposed by Casas is not an optimal solution because phase noise cannot be compactly represented in a fixed basis for all systems. In the method disclosed in the present patent the phase noise is represented in a system-dependent basis (derived from the received data or pre-calibrated) rather than in a fixed basis as in the prior art. This technique provides a significant reduction in phase noise and works well for strong phase noise. The system and time-dependent basis for phase noise representation that is proposed in the present patent is its primary innovation over previous methods. The present patent also discloses other possible enhancements of the technique for MIMO systems, such as online calibration and exploitation of null tones.

BRIEF DESCRIPTION OF THE DRAWINGS

Reference is now made to the accompanying figures, which illustrate aspects of the present invention as described above.

FIGS. 7 to 17 present experimental results from a simulation of the technique for phase noise reduction disclosed in the present invention. The simulation tested the technique's performance on measured WLAN channels, as well as measured phase noise.

FIG. 18 is a block diagram of the Receiver structure for SISO in accordance with the present invention.

FIG. 19 is a block diagram of Phase noise compensation unit in accordance with the present invention.

DETAILED DESCRIPTION OF THE INVENTION

Figure 1:
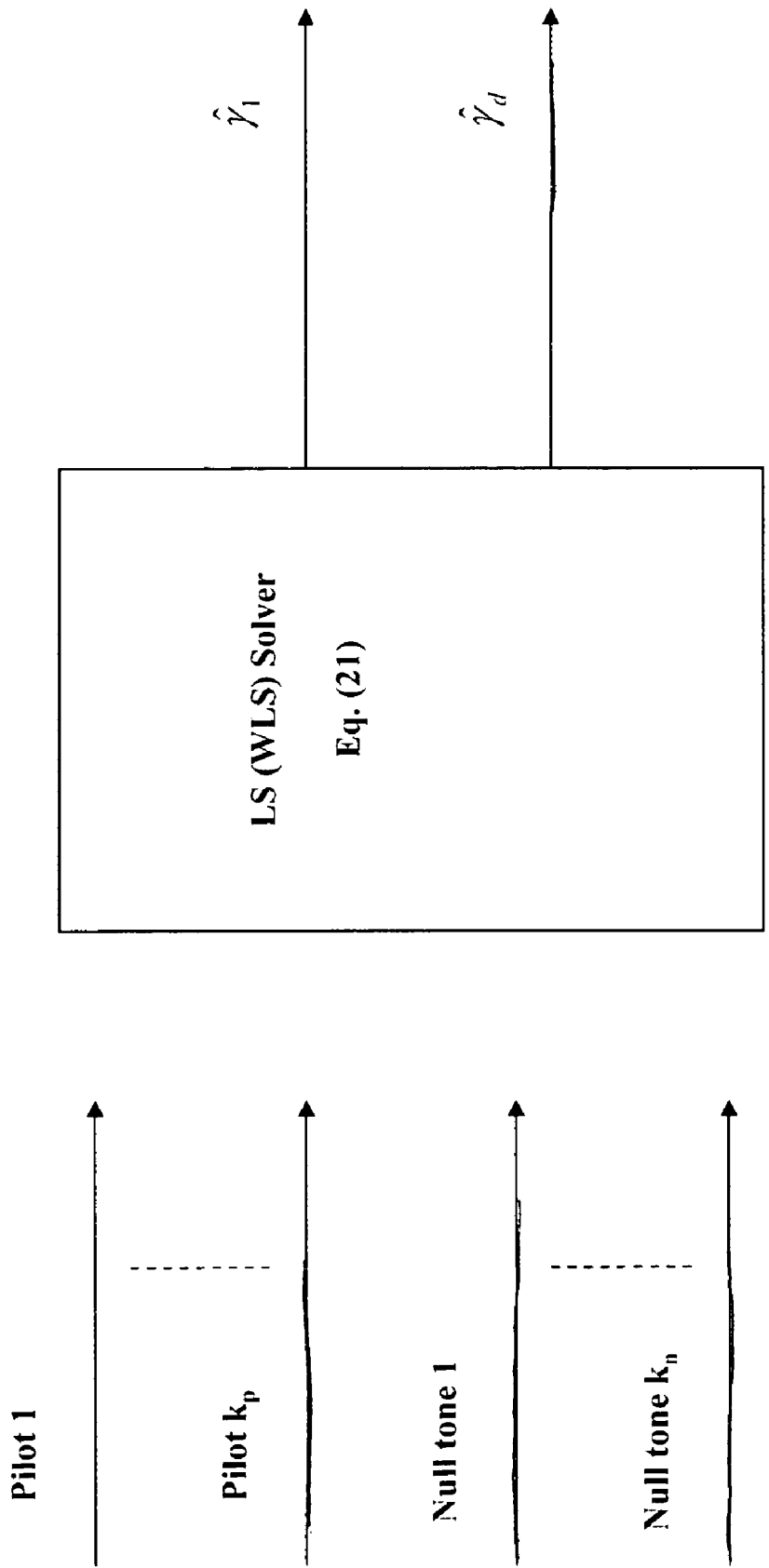
FIG. 1 illustrates a method of phase noise coefficient estimation. The phase noise can be decomposed in some basis $v_0, \ldots, v_{N-1}$ with coefficients $\gamma = [\gamma_0, \ldots, \gamma_{N-1}]^T$ (eq. 15). The d leading coefficients are calculated by a least squares (LS) procedure

One of the main problems of OFDM systems is interference of adjacent tone signals, referred to as inter-carrier interference (ICI).

One major cause of ICI is phase noise caused by instability of local oscillators. ICI limits the use of the entire available spectrum and therefore is a serious obstacle to increasing the system's performance and data transfer rate.

The present invention discloses enhancements to the method of Casas, et al for reducing phase noise in OFDM systems. The Casas method is based on representing the phase noise in a fixed basis unrelated to the specific system, namely the transceiver specifications and environmental parameters. The dominant phase noise components are then estimated using LS fitting of several basis vectors. The present invention suggests replacing the fixed representation of the phase noise with a system and time-dependent representation that changes in real time according to received data. The time-dependent representation of phase noise is calculated on the basis of statistical properties of the phase noise, namely the phase noise time covariance. This covariance can be presented in terms of a covariance matrix. This matrix and the LS fitting are used to calculate the time-dependent representation of the phase noise using basis elements that best represent the phase noise process. This enhanced calculation can substantially reduce phase noise in an OFDM system.

To further improve the present invention, several enhancements are suggested to the main embodiment. These enhancements can contribute substantially to the performance of the proposed scheme by increasing the number of available equations or improving the basis representation of the phase noise.

The first enhancement uses null tones for channel estimation rather than just using tones in which energy has been transmitted. The contribution of null tones depends on the amount of adjacent-channel suppression. With the appropriate amount of adjacent-channel suppression, the null tones can be used to better estimate the level of ICI.

A further enhancement of the present invention can be achieved by applying the proposed method to MIMO OFDM systems. In this kind of system, all the transceivers use the same local oscillator. Because of this, phase noise can be jointly estimated from the pilot symbols received by different antennas. The use of this extra information substantially enhances the applicability of the proposed method and improves the quality of the LS fitting of the coefficients.

Another significant enhancement of the present invention concerns the evaluation of the covariance matrix $R_{\psi\psi}$ defined later in this specification. There are several ways of obtaining the covariance matrix. One way proposed in this invention is to pre-calibrate $R_{\psi\psi}$ and generate basis vectors that are either measured or are calculated from the local oscillator design. These options are simple to implement and are already an improvement over the use of a fixed basis, but might lead to performance degradation due to varying environmental factors such as temperature or due to vendor-dependent behavior. Therefore, in accordance with the present invention, it is further suggested that $R_{\psi\psi}$ can be estimated from received time dependent data and an eigendecomposition be applied to $R_{\psi\psi}$ in order to obtain the basis vectors.

The formal mathematical description of the proposed method is given as follows.

An OFDM system can be described by $$x(t) = \sum_{k=0}^{N-1} s(k) e^{j\omega_k t} \quad 0 \le t \le T_s \tag{1}$$

where $\omega_k = \omega_0 + k\Delta\omega$ is the frequency of the k'th channel, $$k = -\frac{N}{2}, \ldots, \frac{N}{2}, \omega_0$$

is the carrier frequency $$\Delta\omega = \frac{2\pi}{T_s} \tag{2}$$

is the angular sampling frequency, s(k) is the symbol transmitted by the k'th channel and is independent of symbols transmitted over other channels. The OFDM symbol passes through a time invariant channel (a quasi-stationary fading process is assumed) and the received signal y(t) is given by $$y(t) = h*x(t) + n(t) \tag{3}$$

The multiplicative phase noise results from the jitter of the local oscillator of the OFDM system. The additive Gaussian noise is represented by n(t) and can is treated by methods known in the prior art. In this model of the OFDM system, the received signal affected by the phase noise can be written as $$z(t) = y(t) e^{j\phi(t)} + n(t) \tag{4}$$

where $\phi(t)$ is a random process that can be considered as a filtered Gaussian process with PSD $P_\phi(f)$. The multiplicative part of this equation represents the varying in time phase noise component and a time depended component. This multiplicative process $\psi(l) = e^{j\phi(t)}$ includes common phase error, which is constant across the whole of the frequencies, residual frequency offset (a linear phase component) and and time varying random phase contribution of local jitter. (The residual frequency offset is estimated separately, but can be compensated for together with the phase noise.) This process should be estimated, and its effect removed, since it introduces ICI. It is assumed that $\psi(l)$ is a stationary process with a known covariance $r_\psi(\tau)=E[\psi(l)\psi^*(l-\tau)]$.

This assumption is very reasonable when the local oscillator is locked to a stable frequency source through a phase-locked loop. $\psi=(\psi_1, \ldots, \psi_N)^T$ is defined to be a vector of N consecutive samples of the phase noise process $\psi_m=\psi(mT_s)$. The covariance matrix of the phase noise process is written as follows $$R_{\psi\psi} = \begin{bmatrix} E(\psi_1\psi_1^*) & E(\psi_1\psi_n^*) \\ E(\psi_n\psi_1^*) & E(\psi_n\psi_n^*) \end{bmatrix} \quad (5)$$

$R_{\psi\psi}$ can be decomposed using an eigendecomposition as $$R_{\psi\psi} = \sum_{i=0}^{N-1} \mu_i u_i u_i^* \quad (6)$$

It is preferred to use the basis of the eigenvectors of $R_{\psi\psi}$ for representing the phase noise along a single OFDM symbol.

To explain the present invention in simpler terms, a single-input single-output (SISO) model is described and then extended to a multiple-input multiple-output (MIMO) model. This generalization can be made due to the fact that the phase noise is identical on all spatial channels. It is assumed that the OFDM symbols are synchronized and the cyclic prefix has been removed, so that the channel matrix is circulant and is given by $$H = \begin{bmatrix} h_0 & h_1 & \cdots & \cdots & h_L \\ h_L & h_0 & \ddots & & h_{L-1} \\ \vdots & \ddots & \ddots & \ddots & \vdots \\ \vdots & & \ddots & \ddots & \vdots \\ h_1 & \cdots & \cdots & h_L & h_0 \end{bmatrix} \quad (7)$$

Furthermore, a single OFDM symbol will be considered.

The time domain OFDM symbol defined in (1) can be written in terms of discreet Fourier transform (DFT) as $$x=F^*s \quad (8)$$

where $$s=[s_0, \ldots, s_{N-1}]^T \quad (9)$$

is the frequency domain OFDM symbol.

The received OFDM symbol after removal of the cyclic prefix $z=[z_0, \ldots, z_{N-1}]^T$ is now $$z=e^{j\Phi}Hx+n \quad (10)$$

where $n=[n_0, \ldots, n_{N-1}]$ is the additive white Gaussian noise and $$\Phi=\text{diag}(\phi_0, \ldots, \phi_{N-1}) \quad (11)$$

is a diagonal matrix containing the components of the phase noise vector on the diagonal.

Define a received data matrix Z as follows $$Z = \text{diag}(z) = \begin{bmatrix} z_0 & & \\ & \ddots & \\ & & z_{N-1} \end{bmatrix} = Ye^{j\Phi}+N \quad (12)$$

where $$y = Hx+n \quad (13)$$

and $$Y = \begin{bmatrix} y_0 & & \\ & \ddots & \\ & & y_{N-1} \end{bmatrix} = \text{diag}(Hx) \quad (14)$$

is the received signal when no phase noise is present. Thus, the task of ICI suppression is reduced to estimating the phase noise and constructing a time domain vector that cancels the harmful effect of the phase noise.

Time domain compensation in SISO systems is now described.

The point of a time domain method for reducing the phase noise lies in using available pilot data in order to estimate coefficients of a representation of the phase noise. First, the phase compensation algorithm of Casas et al, is explained. Then, the choice of a basis for the phase noise compensation is formulated. It will be shown that using a fixed basis such as Fourier vectors or discrete cosine transform vectors does not provide large gains in terms of ICI cancellation. Next, a system-dependent and time-dependent basis is selected according to the received data. This constitutes the essential improvement of the present invention. This is important for ICI cancellation since the number of available pilots is small and therefore only a few coefficients can be estimated.

We note that common phase noise removal is achieved by choosing the first basis vector to be the N dimensional all-ones vector $1_N=[1, \ldots, 1]^T$.

Let $v_0, \ldots, v_{N-1}$ be a basis for $\square^N$. Denote the phase noise realization $e^{j\Phi}=[e^{j\Phi_1}, \ldots, e^{j\Phi_{N-1}}]^T$ and let $\gamma=[\gamma_0, \ldots, \gamma_{N-1}]^T$ satisfy $$e^{-j\varphi} = \sum_{k=0}^{N-1} \gamma_k v_k. \quad (15)$$

Equivalently $$e^{-j\varphi} = V\gamma \quad (16)$$

where $V = [v_0, \ldots, v_{N-1}]$.

If one allows only d basis vectors $V^{(d)}=[v_0, \ldots, v_{d-1}]$ the current problem could be presented as a least squares (LS) problem. $\hat{\gamma}$ is to be found such that $V^{(d)}\gamma$ cancels the phase noise optimally (in the LS sense), i.e., $$\hat{\gamma} = \arg\min_\gamma \|e^{-j\varphi} - V^{(d)}\gamma\|^2 \quad (17)$$

Since the phase noise is not known, it should be calculated from known OFDM pilot tones. In this case (17) is to be modified assuming that one has known values $s_{pilot}=[s_{i_1}, \ldots s_{i_r}]^T$. Let $\hat{y}$ be an estimate of the time domain symbol with the phase noise removed:

$$\hat{y}=ZV^{(d)}\hat{\gamma}\square Hx+n \quad (18)$$

Since H is diagonalized by the DFT matrix $F_N$, i.e., $H=F_N \Lambda F^*_N$, one obtains that $$\hat{s}=\Lambda^{-1}F_N ZV^{(d)}\hat{\gamma} \qquad (19)$$

is an estimate of the received OFDM frequency domain symbol. Defining $$W=\Lambda^{-1}F_n ZV^{(d)} \qquad (20)$$

one obtains that the LS estimate of $\gamma$ is given by $$\hat{\gamma} = \arg \min_{\gamma}\|s - W\gamma\|^2 \qquad (21)$$

Therefore $$\hat{\gamma}=W_{pilot}^{\dagger}s_{pilot} \qquad (22)$$

where $s_{pilot}$ is obtained by choosing the rows that correspond to pilot tones only.

The estimate of the phase noise cancellation vector is now given by $$e^{-j\phi}=V\hat{\gamma} \qquad (23)$$

It should be noted that the components of Z are affected by noise and the noise is multiplied by $\Lambda^{-1}$. This implies that the estimation of $\gamma$ can be improved using weighted LS (WLS) and total least squares (TLS) instead of the LS method described above.

At this point, the choice of basis vectors $v_0, \ldots, v_{N-1}$ is to be determined. The Casas method suggests the use of either the columns of the DFT matrix $F_N$ or the columns of the Discrete Cosine Transform (DCT) matrix. This assumption has been tested in simulations and on measured phase noise and it was shown that this choice typically leads to a minor improvement over canceling the common phase only, which means that ICI is still significant. In the present invention it is proposed that a different approach should be applied, choosing the basis elements using the statistical properties of the phase noise process. For this purpose, the phase covariance can be represented as $$R_{\psi\psi} = \sum_{k=0}^{N-1} \mu_k u_k u_k^* \qquad (24)$$

where $u_0, \ldots, u_{N-1}$ are the eigenvectors corresponding to eigenvalues $\mu_0 > \ldots > \mu_{N-1}$ respectively. This basis is the best choice for representing random realizations of a random process with covariance $R_{\psi\psi}$ (this is a KL representation of the process). Because the statistical properties of the phase noise process are stationary for quite a long period of time, they can be calibrated in advance.

Another enhancement of the present invention is the use of a prediction/smoothing mechanism. The coefficients $\hat{\gamma}_i$ can be tracked independently (FIG. 5), in this case for each i the previous values of $\hat{\gamma}_i$ are fed into a filter with coefficients $\beta_{i1}, \ldots, \beta_{iL}$, then $\hat{\gamma}_i$ are smoothed on the basis of $\beta_{i1}, \ldots, \beta_{iL}$. Alternatively, a joint tracking of $\hat{\gamma}_1, \ldots, \hat{\gamma}_d$ using a matrix finite impulse response (FIR) filter can be performed. This tracking is done using a multidimensional recursive least square (RLS) solution. In this case the previous values of $\hat{\gamma}_1, \ldots, \hat{\gamma}_d$ are fed into a matrix FIR system that is adapted based on previous decisions (FIG. 6).

The algorithm proposed in the present invention ensures reasonable computer running time. The complexity of the phase noise reduction process is estimated as follows.

The compensation of the phase noise involves dN complex multiplications where d is the number of the basis elements. This is less than the fast Fourier transform (FFT) complexity adding d multiplications per symbol. The main complexity is hidden in the LS itself. However, it should be noted that forming the matrix W involves computing $$W=\Lambda^{-1}F_N ZV^{(d)} \qquad (25)$$

However, $\Lambda^{-1}F_N Z$ is a diagonal matrix composed of the frequency domain equalized, which receives symbols that are generated without compensating for the phase noise effect. Solving the LS problem (21) involves only matrices of size $n_{pilot} \times d$ resulting in $cn_{pilot}d^2$ operations. The power-like complexity enables an efficient implementation of the novel method presented in this invention in real systems.

Reference is now made to the accompanying figures, which illustrate aspects of the present invention as described above.

FIG. 1 illustrates a method of phase noise coefficient estimation. The phase noise can be decomposed in some basis $v_0, \ldots, v_{N-1}$ with coefficients $\gamma=[\gamma_0, \ldots, \gamma_{N-1}]^T$ (eq. 15). To estimate the $\hat{\gamma}$, pilot and null tones are used as an input (eq. 18-20). $\hat{\gamma}$ are calculated by a least squares (LS) procedure. The evaluation of $\hat{\gamma}$ can be further improved using weighted LS (WLS) and/or total LS instead of LS.

Figure 2:
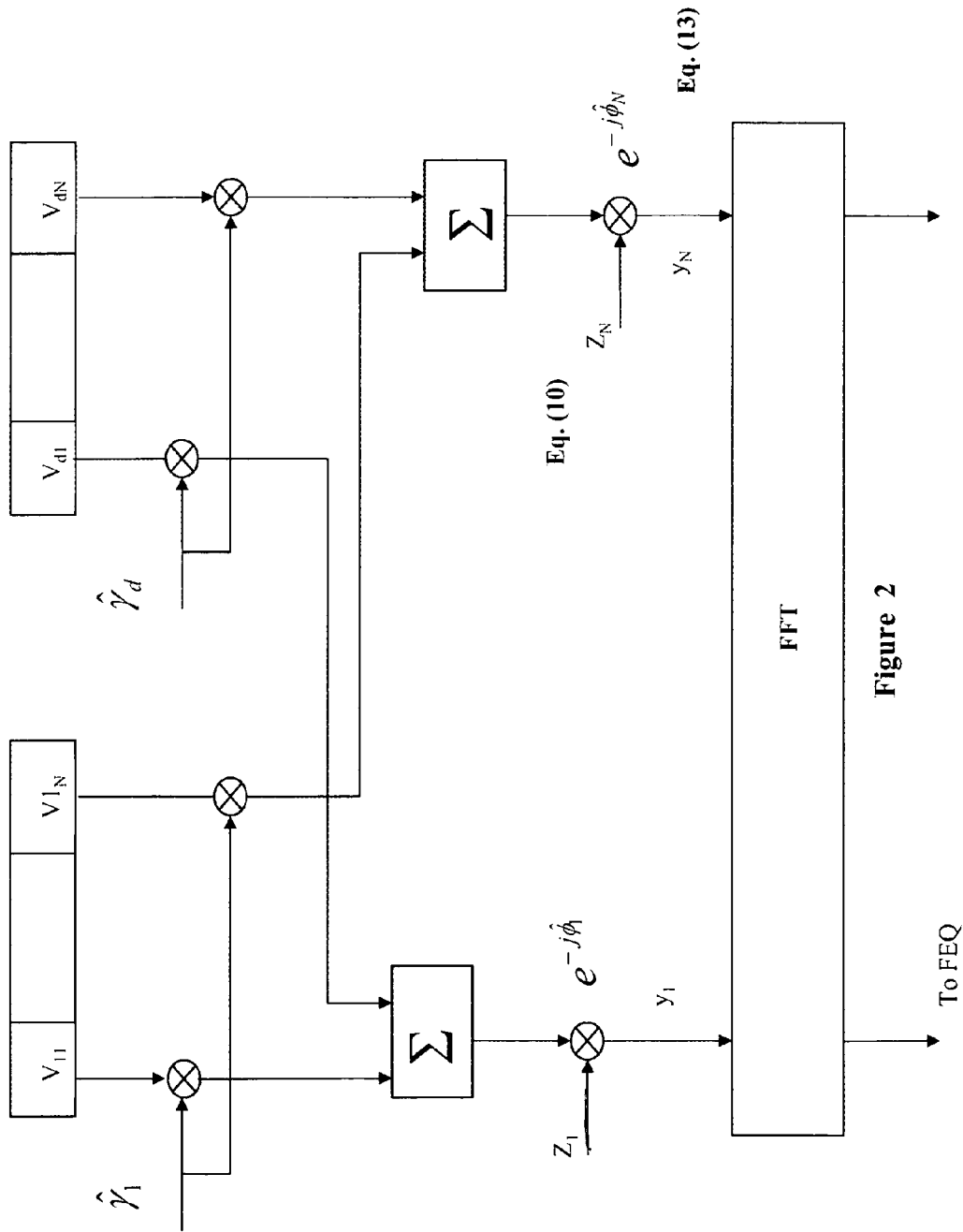
FIG. 2 shows schematically the phase noise compensation process (eq. 7-14). The coefficients $\hat{\gamma}$ and basis vectors $v_0, \ldots, v_{d-1}$ of the phase noise decomposition are multiplied respectively and then summed over ($\Sigma$) to get $e^{-j\hat{\phi}_i}$. The multiplicative noise $e^{-j\hat{\phi}_i}$ is then removed from received OFDM signal $z_i$.

FIG. 2 shows schematically the phase noise compensation process (eq. 7-14). The coefficients $\hat{\gamma}$ and basis vectors $v_0, \ldots, v_{d-1}$ of the phase noise decomposition are multiplied respectively and then summed over ($\Sigma$) to get $e^{-j\phi_i}$. The multiplicative noise $e^{-j\phi_i}$ is then removed from received OFDM signal $z_i$. The resulting signal $y_i$ with no phase noise present is finally FFT transformed and processed by frequency domain equalizers (FEQ).

Figure 3:
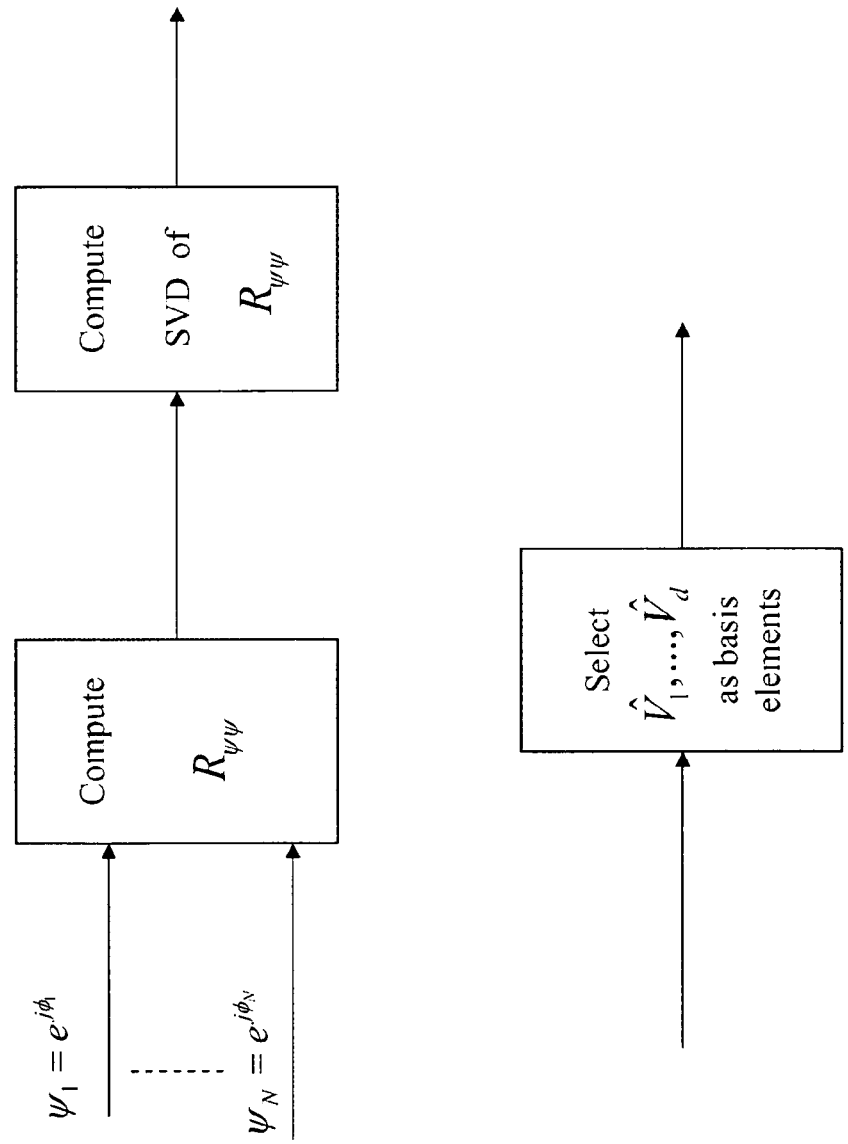
FIG. 3 depicts calibration-based basis estimation. The figure depicts a choice of the basis elements of the phase noise decomposition from the statistical properties of the phase noise itself.

FIG. 3 depicts calibration-based basis estimation. In the prior art (Casas) the constant basis of eigenvectors of DFT or DCT is used independent of the statistical properties of the phase noise. This does not provide a desirable degree of phase noise elimination. The present invention suggests a choice of the basis elements from the statistical properties of the phase noise itself. It is assumed that the phase noise has covariance $R_{\psi\psi}$ with eigenvectors $u_0, \ldots, u_{N-1}$ corresponding to eigenvalues $\mu_0 > \ldots > \mu_{n-1}$. Samples of the phase noise are generated and used to estimate $R_{\psi\psi}$. Alternatively $R_{\psi\psi}$ can be computed from the specific design of the local oscillator and the phase locked loop (PLL) regulating it. The proper basis $v_0, \ldots, v_{N-1}$ should be now chosen from the singular value decomposition (which is equivalent to the eigenvalues) of $R_{\psi\psi}$.

It is claimed by the present invention that the eigenvectors $u_0, \ldots, u_{N-1}$ are the best choice for the basis $v_0, \ldots, v_{N-1}$ of the multiplicative phase noise expansion (eq. 24). Furthermore, if the choice is limited only to d (for any d<N) vectors then the best choice is to select $u_0, \ldots, u_{d-1}$.

Figure 4:
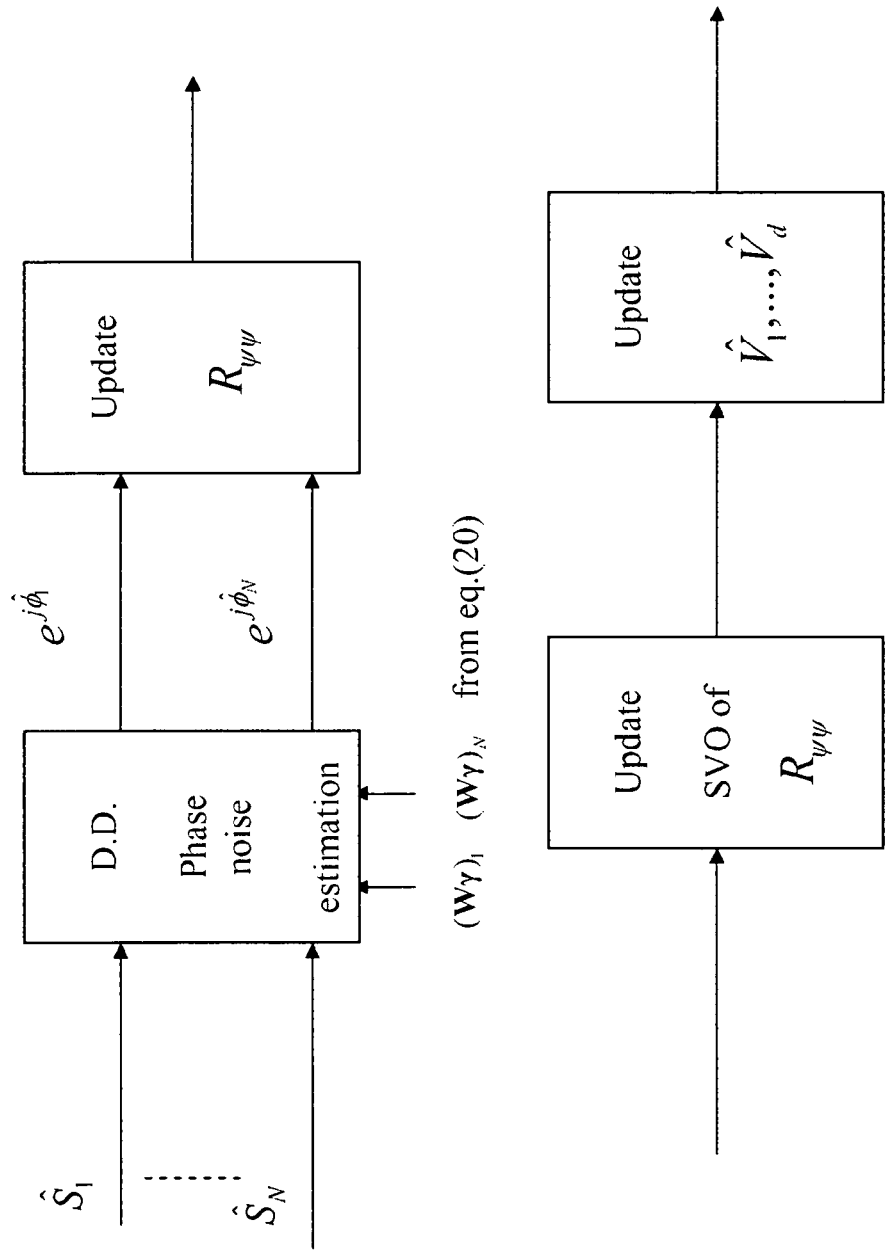
In FIG. 4, a decision-directed basis estimation is presented. This enhances the proposed method of FIG. 3 by allowing the basis itself to adapt to environmental changes.

In FIG. 4, a decision-directed basis estimation is presented. This enhances the proposed method of FIG. 3 by allowing the basis itself to adapt to environmental changes. Based on the previous symbol estimation, the W matrix is updated (eq. 20). Then using the LS or WLS procedure, one finds eigenvalues of the multiplicative phase noise expansion (eq. 21-23) and the phase noise covariance $R_{\psi\psi}$ is updated. Finally, from the covariance matrix one extracts the updated basis $v_0, \ldots, v_{N-1}$ for the phase noise expansion. The updates can be used for direct update of the dominant subspace using subspace tracking techniques, such as the projective approximation subspace tracking algorithm [Yang] or similar techniques.

Figure 5:
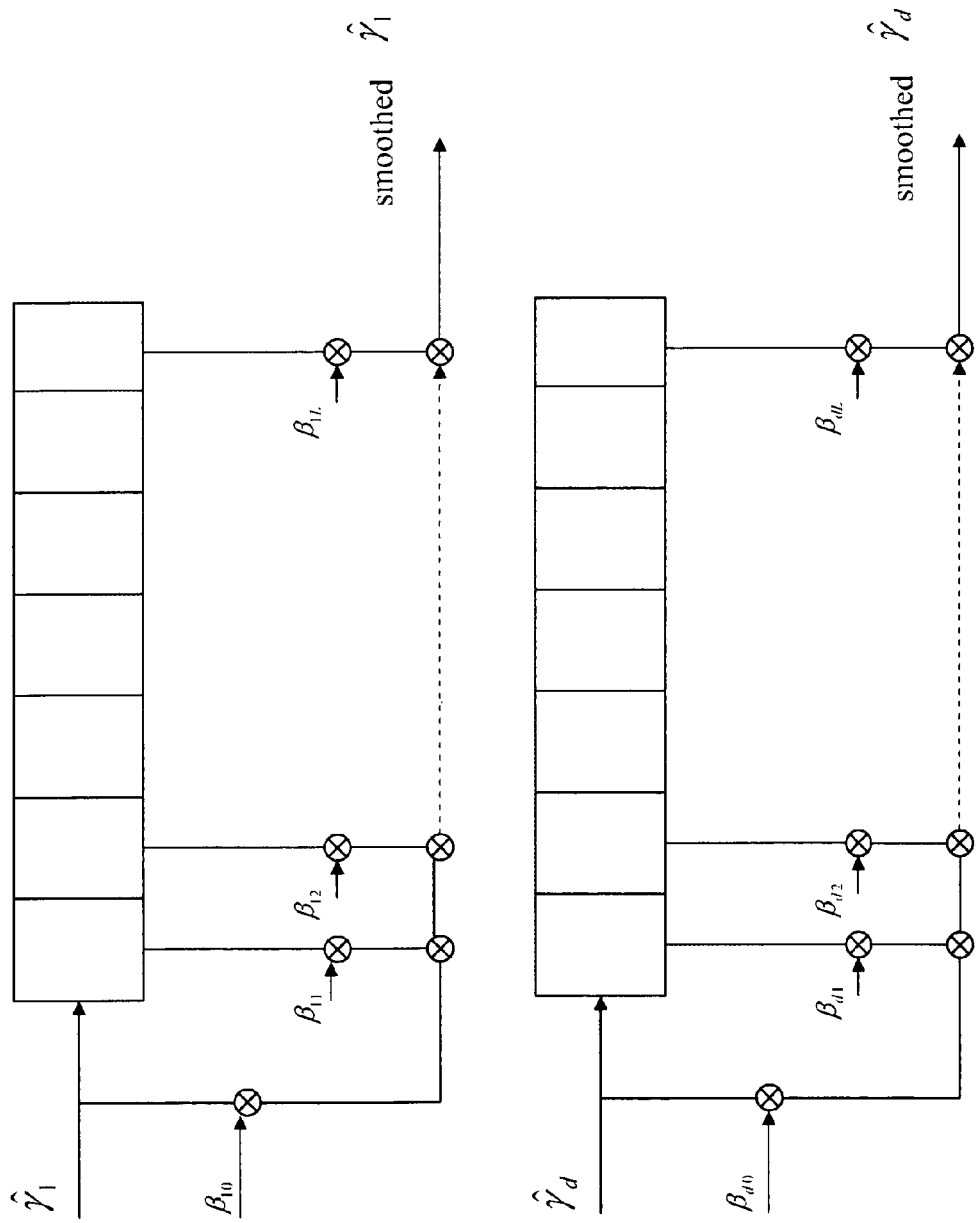
FIG. 5 illustrates an independent tracking of coefficients $\hat{\gamma}$ of the multiplicative phase noise expansion $e^{-j\hat{\phi}_i}$. For each i the previous values of $\hat{\gamma}_i$ are fed into a finite impulse response (FIR) filter with coefficients $\beta_{i1}, \ldots, \beta_{iL}$ then $\hat{\gamma}_i$ is smoothed on the basis of coefficients $\beta_{i1}, \ldots, \beta_{iL}$.
Figure 6:
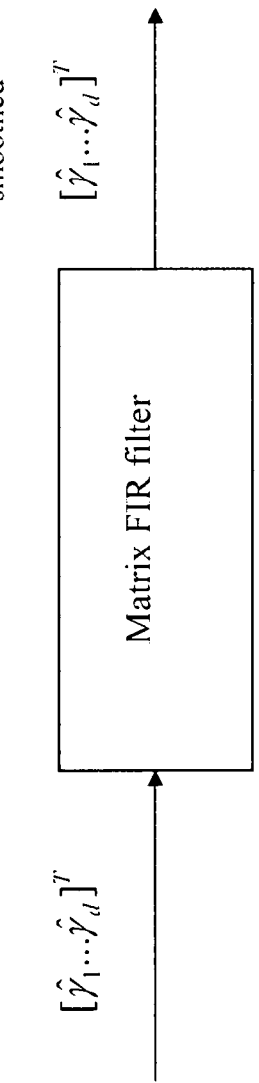
FIG. 6 shows schematically joint tracking of coefficients $\gamma = [\gamma_0, \ldots, \gamma_{d-1}]^T$ with the use of a matrix finite impulse response filter (FIR).

FIG. 5 illustrates an independent tracking of coefficients $\hat{\gamma}$ of the multiplicative phase noise expansion $e^{-j\phi_i}$. For each i the previous values of $\hat{\gamma}_i$ are fed into a filter with coefficients $\beta_{i1}, \ldots, \beta_{iL}$, then $\hat{\gamma}_i$ is smoothed on the basis of coefficients $\beta_{i1}, \ldots, \beta_{iL}$.

FIG. 6 shows schematically joint tracking of coefficients $\gamma = [\gamma_0, \ldots, \gamma_{N-1}]^T$ with the use of a finite impulse response filter (FIR). Previous values of $\hat{\gamma}_1, \ldots, \hat{\gamma}_d$ are fed into a matrix FIR system that is adapted based on previous decisions, and then the tracking is done using a multidimensional RLS solution.

FIGS. 7 to 18 present experimental results from a simulation of the technique for phase noise reduction disclosed in the present invention. The simulation tested the technique's performance on measured WLAN channels and using measured phase noise.

The channels are depicted in FIG. 7. The transmitted power was 13 dBm and the assumed noise figure was 7 dB. The phase noise was generated using a third order Chebychev type I filter with cut-off frequency of 150 kHz and PSD depicted in FIG. 8.

The standard deviation of the phase noise was 3°. Two channels and tones number 1-7, 21, 43, 58-64 at each of the two receivers were used. FIG. 9 presents a constellation diagram based on 100 OFDM symbols and 64 tones. Note the 0 symbols in the center of the diagram. The large performance enhancement is clearly visible. FIG. 10 presents the results of the same experiment using DFT basis vectors as suggested by Casas. The difference in performance is clearly visible. FIG. 11 depicts the dependence of the residual error vector magnitude (EVM) on the number of basis elements using Karhunen-Loeve (KL) basis vectors and discreet Fourier transform (DFT) basis vectors. The KL eigenvectors were computed based on 3 OFDM symbols. For a large number of parameters the EVM is larger due to the insufficient number of equations. The large gain compared to the DFT basis is clearly visible. To obtain the performance under good phase noise and channel conditions, the experiment was repeated with phase noise of 0.7° and with the channels attenuation reduced by 5 dB compared to FIG. 7. The results are presented in FIG. 12 to FIG. 15. Even in this case, there is a substantial gain by canceling the phase noise, although the phase noise performance is reasonable even with CPE-only compensation.

In the second set of simulated experiments, phase noise samples were measured. The measured signal included a sine wave at 5 MHz, sampled at 40 MHz and then filtered to remove the sine wave. The PSD of the phase noise is depicted in FIG. 16. This experiment was repeated with samples of the measured phase noise. The results are depicted in FIG. 17. The gain is lower, but it is still substantial.

FIG. 18 depicts the structure of a basic SISO receiver as suggested according to the present invention. The SISO receiver is a conventional OFDM receiver known in the prior art (van Nee and Prasad) with a new unit 106 added for performing the phase noise compensation. Unit 101 is the radio frequency (RF) frontend connected to the antenna and performing down conversion of the received RF signal into a baseband signal. The baseband signal is sampled using an analog-to-digital converter (unit 102). The baseband receiver removes the cyclic prefix (unit 103) and converts the input stream into synchronized blocks of N samples (unit 104). The data is then directed into the phase noise estimation unit (106), which provides a phase noise compensating signal (Equation 23). In parallel the original data is buffered through unit (105) and then multiplied by the respective sample of noise compensating signal (Equation 23) and transferred to a Fast Fourier Transform (FFT) unit (107). The output of the FFT is then processed in a frequency domain processing unit 108, which performs frequency domain equalization, soft demapping, deinterleaving, and decoding of the forward error correction code etc.

FIG. 19 illustrates the phase noise estimation unit 106 shown in FIG. 18. Unit 106 consists of FFT unit 201, which computes the received signal using the pilot tones and null tones. FFT unit 201 can be replaced in some cases by a Direct Fourier Transform (DFT) unit because the number of pilot tones is small compared to the FFT size, or by other types of units which are based on other known in the art techniques for extracting the pilot and null tones. The received tones are then fed into coefficient estimation unit 202 (detailed in FIG. 1), which estimates basis coefficients of the phase noise. The estimated coefficients are then fed into compensating signal generation unit 203 (detailed in FIG. 2), which uses the system and time-dependent representation and the coefficients to generate phase noise compensating signal.

While the above description contains many specifics, these should not be construed as limitations on the scope of the invention, but rather as exemplifications of the preferred embodiments. Those skilled in the art will envision other possible variations that are within the scope of the invention. Accordingly, the scope of the invention should be determined not by the embodiment illustrated, but by the appended claims and their legal equivalents.

What is claimed is:

1. A method of reducing phase noise in OFDM systems the method comprising:
   obtaining a received data matrix Z that is diagonal and exhibits sampled OFDM signal values z in accordance with a received OFDM signal comprising transmitted OFDM signal multiplied by a known phase noise process over a channel having a matrix channel H, wherein the OFDM signal comprises at least one pilot tone;
   obtaining a covariance matrix of the known phase noise process;
   decomposing the covariance matrix into eigenvectors;
   creating a matrix V from all decomposed eigenvectors;
   calculating a discrete fourier transform matrix F representing the transformation from an OFDM symbol to OFDM signal in a particular OFDM system;
   diagonalizing the channel matrix H utilizing Matrix F;
   calculating a matrix W by multiplying an inverse matrix of the diagonalized H matrix, with matrix F, matrix Z, and matrix V;
   estimating the phase noise coefficients by multiplying W with the at least one OFDM pilot tone; and
   estimating a phase noise cancellation vector by multiplying the estimated phase noise coefficients with matrix V.

* * * * *